United States Patent
Rusignuolo et al.

(10) Patent No.: US 9,975,403 B2
(45) Date of Patent: May 22, 2018

(54) TRANSPORT REFRIGERATION SYSTEM AND METHOD FOR OPERATING

(75) Inventors: Giorgio Rusignuolo, Manlius, NY (US); Peter R. Bushnell, Cazenovia, NY (US); Nader S. Awwad, Baldwinsville, NY (US); Bruce E. Sing, Carmel, IN (US); John R. Reason, Liverpool, NY (US); Benjamin E. Ferguson, Cazenovia, NY (US)

(73) Assignee: CARRIER CORPORATION, Farmington, CT (US)

( * ) Notice: Subject to any disclaimer, the term of this patent is extended or adjusted under 35 U.S.C. 154(b) by 706 days.

(21) Appl. No.: 14/009,586

(22) PCT Filed: Mar. 27, 2012

(86) PCT No.: PCT/US2012/030645
§ 371 (c)(1),
(2), (4) Date: Oct. 3, 2013

(87) PCT Pub. No.: WO2012/138500
PCT Pub. Date: Oct. 11, 2012

(65) Prior Publication Data
US 2014/0026599 A1    Jan. 30, 2014

Related U.S. Application Data

(63) Continuation of application No. PCT/EP2014/051585, filed on Jan. 28, 2014.

(51) Int. Cl.
*B60H 1/32* (2006.01)
*F25B 49/02* (2006.01)
(Continued)

(52) U.S. Cl.
CPC ....... *B60H 1/3204* (2013.01); *B60H 1/00428* (2013.01); *F25B 27/02* (2013.01);
(Continued)

(58) Field of Classification Search
CPC ...... F25B 27/00; F25B 27/02; B60H 1/00428; B60H 1/3232; B60H 1/00378;
(Continued)

(56) References Cited

U.S. PATENT DOCUMENTS 2,907,182 A    10/1959    Kuklinski
3,512,373 A    5/1970    White
(Continued)

FOREIGN PATENT DOCUMENTS

CN    101331369 A    12/2008
CN    101969224 A    2/2011
(Continued)

OTHER PUBLICATIONS

PCT International Search Report and Written Opinion of the International Searching Authority for International Application No. PCT/US2012/030645, dated Jun. 19, 2012, 11 pages.
(Continued)

*Primary Examiner* — Emmanuel Duke
(74) *Attorney, Agent, or Firm* — Cantor Colburn LLP

(57) ABSTRACT

A refrigeration system having a refrigeration unit (22) for providing temperature conditioned air to a temperature controlled space, an engine (26) and an electric generation device (24) driven by the engine, is provided with a battery system (28) for supplying electric power. A method of operating the transport refrigeration includes, during a high cooling demand mode, operating the engine (26) to drive the electric generation device (24) for supplying electric power and simultaneously employing the battery system (28) for
(Continued)

supplying electric power to jointly power the plurality of power demand loads (50, 42, 46, 48) of the refrigerant unit.

9 Claims, 2 Drawing Sheets

(51) Int. Cl.
F25B 27/02 (2006.01)
B60H 1/00 (2006.01)
(52) U.S. Cl.
CPC ........ *F25B 49/025* (2013.01); *F25B 2400/01* (2013.01); *F25B 2600/021* (2013.01)
(58) Field of Classification Search
CPC ........ B60H 1/3222; B60H 1/004; B60H 1/32; B60H 1/00
USPC .......................................................... 62/126
See application file for complete search history.

(56) References Cited

U.S. PATENT DOCUMENTS

| | | | |
|---|---|---|---|
| 3,545,222 A | 12/1970 | Petranek | |
| 3,844,130 A | 10/1974 | Wahnish | |
| 3,866,433 A | 2/1975 | Krug | |
| 3,941,012 A | 3/1976 | Mayer | |
| 4,448,157 A | 5/1984 | Eckstein et al. | |
| 4,531,379 A | 7/1985 | Diefenthaler, Jr. | |
| 4,682,649 A | 7/1987 | Greer | |
| 4,762,170 A | 8/1988 | Nijjar et al. | |
| 4,934,158 A | 6/1990 | Sakano | |
| 4,977,752 A | 12/1990 | Hanson | |
| 5,056,330 A | 10/1991 | Isobe et al. | |
| 5,249,429 A | 10/1993 | Hanson | |
| 5,265,435 A | 11/1993 | Richardson | |
| 5,487,278 A | 1/1996 | Hilleveld et al. | |
| 5,528,901 A | 6/1996 | Willis | |
| 5,867,996 A | 2/1999 | Takano et al. | |
| 5,896,750 A | 4/1999 | Karl | |
| 5,934,089 A * | 8/1999 | Nakagawa | B60H 1/004 62/133 |
| 6,217,297 B1 | 4/2001 | Tsumagari et al. | |
| 6,223,546 B1 | 5/2001 | Chopko et al. | |
| 6,226,998 B1 | 5/2001 | Reason et al. | |
| 6,321,550 B1 | 11/2001 | Chopko et al. | |
| 6,351,957 B2 | 3/2002 | Hara | |
| 6,357,248 B1 | 3/2002 | Bongaards et al. | |
| 6,367,270 B2 | 4/2002 | Niimi et al. | |
| 6,405,550 B1 | 6/2002 | Reason et al. | |
| 6,443,712 B2 | 9/2002 | Sakai et al. | |
| 6,557,361 B1 | 5/2003 | Howard | |
| 6,622,505 B2 | 9/2003 | Anderson et al. | |
| 6,675,596 B2 | 1/2004 | Iwanami et al. | |
| 6,688,125 B2 | 2/2004 | Okamoto et al. | |
| 6,742,350 B2 | 6/2004 | Suzuki et al. | |
| 6,745,585 B2 | 6/2004 | Kelm et al. | |
| 6,755,041 B2 | 6/2004 | Wessells et al. | |
| 6,756,693 B2 | 6/2004 | Kennedy | |
| 6,758,049 B2 | 7/2004 | Adachi et al. | |
| 6,812,582 B2 | 11/2004 | Kennedy | |
| 6,830,438 B2 | 12/2004 | Iwanami et al. | |
| 6,889,762 B2 | 5/2005 | Zeigler et al. | |
| 6,892,549 B2 | 5/2005 | Komura et al. | |
| 6,932,148 B1 | 8/2005 | Brummett et al. | |
| 6,973,798 B2 | 12/2005 | Ikura et al. | |
| 6,978,632 B2 | 12/2005 | Suzuki et al. | |
| 6,981,544 B2 | 1/2006 | Iwanami et al. | |
| 7,076,963 B2 | 7/2006 | Higashiyama | |
| 7,104,765 B2 | 9/2006 | Miyaji et al. | |
| 7,150,159 B1 | 12/2006 | Brummett et al. | |
| 7,151,326 B2 | 12/2006 | Jordan | |
| 7,296,427 B2 | 11/2007 | Suzuki et al. | |
| RE40,286 E | 5/2008 | Biess et al. | |
| 7,543,454 B2 | 6/2009 | Harris | |
| 7,673,466 B2 | 3/2010 | Pacy | |
| 7,878,013 B2 | 2/2011 | Matsuno et al. | |
| 8,030,880 B2 | 10/2011 | Alston et al. | |
| 8,051,670 B2 | 11/2011 | Viegas et al. | |
| 2002/0108388 A1 | 8/2002 | Wilson et al. | |
| 2002/0108389 A1 | 8/2002 | Chopko et al. | |
| 2003/0049133 A1 * | 3/2003 | Major | B60H 1/3222 417/16 |
| 2003/0201097 A1 * | 10/2003 | Zeigler | B60H 1/00378 165/240 |
| 2004/0009073 A1 * | 1/2004 | Sato | B60H 1/3222 417/15 |
| 2007/0221370 A1 | 9/2007 | Allen et al. | |
| 2008/0023965 A1 | 1/2008 | Cagliari et al. | |
| 2008/0034773 A1 | 2/2008 | Karapetian | |
| 2008/0163633 A1 | 7/2008 | Magri et al. | |
| 2008/0276913 A1 * | 11/2008 | Zubeck | B60K 6/442 123/543 |
| 2009/0056354 A1 | 3/2009 | Davis et al. | |
| 2009/0120115 A1 | 5/2009 | Hamilton | |
| 2009/0314019 A1 * | 12/2009 | Fujimoto | B60H 1/3222 62/228.5 |
| 2010/0045105 A1 * | 2/2010 | Bovio | B60H 1/00428 307/9.1 |
| 2010/0089083 A1 | 4/2010 | Awwad et al. | |
| 2010/0138089 A1 | 6/2010 | James | |
| 2010/0154449 A1 | 6/2010 | Stover, Jr. et al. | |
| 2010/0171364 A1 | 7/2010 | Awwad | |
| 2010/0180614 A1 | 7/2010 | Larson et al. | |
| 2010/0229581 A1 * | 9/2010 | Truckenbrod | B60H 1/004 62/236 |
| 2010/0274604 A1 | 10/2010 | Crilly | |
| 2011/0000244 A1 * | 1/2011 | Reason | B60H 1/00428 62/323.3 |
| 2011/0114398 A1 | 5/2011 | Bianco | |
| 2011/0132006 A1 | 6/2011 | Milton et al. | |
| 2011/0162395 A1 * | 7/2011 | Chakiachvili | B60H 1/00014 62/115 |
| 2011/0247350 A1 | 10/2011 | Awwad et al. | |
| 2011/0265500 A1 * | 11/2011 | Black, Jr. | F25D 29/00 62/89 |
| 2011/0283721 A1 | 11/2011 | Pandzik | |
| 2011/0301762 A1 | 12/2011 | Walker et al. | |
| 2013/0253744 A1 * | 9/2013 | Nishimine | B60W 10/08 701/22 |

FOREIGN PATENT DOCUMENTS

| | | | |
|---|---|---|---|
| JP | H0666110 A | | 3/1994 |
| JP | 2001130250 A | * | 5/2001 |
| JP | 2002081821 A | | 3/2002 |
| JP | 2002127809 A | * | 5/2002 |
| WO | 2009008859 A1 | | 1/2009 |
| WO | 2009029205 A1 | | 3/2009 |
| WO | 2010032074 A1 | | 3/2010 |
| WO | WO 2010032074 A1 | * | 3/2010 ......... B60H 1/00014 |

OTHER PUBLICATIONS

Notification of Transmittal of the International Preliminary Report on Patentability of the International Searching Authority, or the Declaration; PCT/US2012/030645; dated Oct. 8, 2013.
Chinese First Office Action for application CN 201280019258.5, dated Apr. 3, 2015, 7 pages.

* cited by examiner

TRANSPORT REFRIGERATION SYSTEM AND METHOD FOR OPERATING

CROSS-REFERENCE TO RELATED APPLICATION

Reference is made to and this application claims priority from and the benefit of U.S. Provisional Application Ser. No. 61/471,463, filed Apr. 4, 2011, and entitled TRANSPORT REFRIGERATION SYSTEM AND METHOD FOR OPERATING, which application is incorporated herein in its entirety by reference.

BACKGROUND OF THE INVENTION

This invention relates generally to transport refrigeration systems and, more particularly, to supplying electrical power to all the power demand loads of the transport refrigeration unit while reducing engine fuel consumption.

Refrigerated trucks and hailers are commonly used to transport perishable cargo, such as, for example, produce, meat, poultry, fish, dairy products, cut flowers, and other fresh or frozen perishable products. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

On commercially available transport refrigeration systems used in connection with refrigerated trucks and refrigerated trailers, the compressor, and typically other components of the transport refrigeration unit, must be powered during transit by a prime mover. In the case of refrigerated trailers, the prime mover typically comprises a diesel engine carried on and considered part of the transport refrigeration system. In mechanically driven transport refrigeration systems the compressor is driven by the diesel engine, either through a direct mechanical coupling or a belt drive, and other components, such as the condenser and evaporator fans are belt driven.

An all electric transport refrigeration system for refrigerated trailer application is also commercially available through Carrier Corporation headquartered in Farmington, Conn., USA. In the all electric transport refrigeration system, a prime mover, most commonly a diesel engine, carried on and considered part of the transport refrigeration system, drives an AC synchronous generator that generates AC power. The generated AC power is used to power an electric compressor motor for driving the refrigerant compressor of the transport refrigeration unit and also powering electric AC fan motors for driving the condenser and evaporator motors and electric heaters associated with the evaporator. For example, U.S. Pat. No. 6,223,546 discloses an all electric transport refrigeration system.

In conventional practice, a transport refrigeration unit installed on a refrigerated truck or trailer operates in one of a temperature pulldown mode, a temperature maintenance mode, or a standstill mode. In the temperature pulldown mode, the refrigerant compressor, the condenser fan(s) and the evaporator fan(s) are operating with the refrigerant compressor generally operating at full capacity to lower the temperature within the cargo space as rapidly as possible to a desired set point temperature appropriate for the particular cargo stowed in the cargo space. In the temperature maintenance mode, the refrigerant compressor, the condenser fan(s) and the evaporator fan(s) are still operating, but the refrigerant compressor is operating at a significantly lower capacity so as to maintain the temperature in the cargo space within a specified range of the desired set point temperature and avoid over cooling. In the temperature maintenance mode, heaters associated with the evaporator may also be activated as necessary to warm the air passed through the evaporators by the evaporator fan(s) to prevent over cooling. In the standstill mode, the refrigerant compressor and the condenser and evaporator fans are off.

Diesel engines used as prime movers on transport refrigeration systems generally have two operating speeds, that is a high RPM speed, such as 2200 RPM, and a low RPM speed, such as 1400 RPM. In operation, the diesel engine is operated at high speed during temperature pulldown and at low speed during the temperature maintenance mode. During standstill, the diesel engine is typically idling at low speed. The diesel engine is generally designed to meet the power needs of the transport refrigeration system during operation at maximum capacity, such as during the temperature pulldown mode, with efficient fuel consumption. Therefore, during the temperature maintenance mode and standstill mode, the diesel engine is operating at lower efficiency and with increased fuel consumption.

SUMMARY OF THE INVENTION

It would be desirable to reduce overall fuel consumption in a transport refrigeration system by reducing the time the engine is operating and/or reducing the size of the engine. It would also be desirable to have the capability to operate the transport refrigeration unit with reduced noise generation, particularly during the night when in populated areas.

A method is provided for operating a refrigeration system having a refrigeration unit for providing temperature conditioned air to a temperature controlled space, an engine and an electric generation device. The disclosed method includes the steps of: providing a battery system having a least one battery unit supplying electric power, and during a high cooling demand mode, operating the engine to drive the electric generation device for supplying electric power and simultaneously employing the battery system for supplying electric power to jointly power the plurality of power demand loads of the refrigerant unit. The disclosed method may include the further step of, during a low cooling demand mode, operating the engine to drive the electric generation device to power the plurality of power demand loads of the refrigeration unit and also charge the battery system. The disclosed method may include the step of, during a low cooling demand mode, employing the battery system to power the plurality of power demand loads of the refrigeration unit. The method may include the step of, during a period of shutdown of the engine, employing the battery system to power the plurality of power demand loads of the refrigeration unit, which may include the step of selectively powering the refrigeration heat absorption heat exchanger for selected periods of time and at selected intervals.

In an embodiment of the disclosed method wherein the refrigeration unit includes a refrigerant compression device, a refrigerant heat rejection heat exchanger and an associated fan, a refrigerant heat absorption heat exchanger and an associated fan, and a plurality of power demand loads including a compression device drive motor, a refrigerant heat rejection heat exchanger fan motor and a refrigerant heat absorption heat exchanger fan motor, the step of operating the engine to drive the electric generation device and simultaneously employing the battery system to power the plurality of power demand loads of the refrigerant unit during a high cooling demand mode includes the step of simultaneously operating both the engine to drive the electric generation device and employing the battery system to power the compression device drive motor. In this embodiment, the method may include the step of employing the battery system to power the refrigerant heat rejection heat exchanger fan motor and the refrigerant heat absorption heat exchanger fan motor.

In an embodiment of the method wherein the refrigeration unit includes a refrigerant compression device, a refrigerant heat rejection heat exchanger and an associated fan, a refrigerant heat absorption heat exchanger and an associated fan, and a plurality of power demand loads including a compression device drive motor, a refrigerant heat rejection heat exchanger fan motor and a refrigerant heat absorption heat exchanger fan motor, the step of operating the engine to drive the electric generation device and simultaneously employing the battery system to power the plurality of power demand loads of the refrigerant unit during a high cooling demand mode includes the step of operating the engine to drive the electric generation device to power the compression device drive motor and employing the battery system to power the refrigerant heat rejection heat exchanger fan motor and the refrigerant heat absorption heat exchanger fan motor.

The high cooling demand mode may comprise a temperature pulldown mode wherein the refrigeration unit is operated to reduce a temperature within the temperature controlled space to a set-point temperature. The low cooling demand mode comprises a temperature control mode wherein the transport refrigeration unit is operated to maintain a temperature within the temperature controlled space within a specified range of a set-point temperature. The temperature controlled space comprises the perishable cargo hold of a truck, trailer, intermodal container or other transport container.

In an aspect, a transport refrigeration system is provided having a refrigeration unit for providing temperature conditioned air to a cargo storage space of a truck, trailer, intermodal container or other transport container, the refrigeration unit having a refrigerant compression device, a refrigerant heat rejection heat exchanger and an associated fan, a refrigerant heat absorption heat exchanger and an associated fan, and a plurality of power demand loads including a compression device drive motor, a refrigerant heat rejection heat exchanger fan drive motor and a refrigerant heat absorption heat exchanger fan drive motor, the transport refrigeration system having an electric generating device and an engine for driving the electric generating device. The transport refrigeration system further includes a controller operatively associated with the refrigeration unit, the controller operative to selectively operate the refrigeration unit in a high cooling demand mode during which the controller operates the engine to drive the electric generation device for supplying electric power and simultaneously employs the battery system to supply electric power to jointly power the plurality of power demand loads of the refrigerant unit.

In an embodiment, the controller is further operative to selectively operate the refrigeration unit in a low cooling demand mode and during operation in the low cooling demand mode operating the engine to drive the electric generation device to power the plurality of power demand loads of the refrigeration unit and also charge the battery system. In an embodiment, the controller is further operative to selectively operate the refrigeration unit in a low cooling demand mode and during operation in the low cooling demand mode employing the battery system to power the plurality of power demand loads of the refrigeration unit. In an embodiment, the controller is further operative to selectively shutdown the engine and the refrigerant compression device and to selectively employ the battery system to power the refrigerant heat absorption heat exchanger fan. In an embodiment, the controller employs the battery system to selectively power the refrigeration heat absorption heat exchanger fan for selected periods of time and at selected intervals. In an embodiment, the controller may simultaneously operate the engine to drive the electric generation device and employ the battery system to jointly power the compression device motor. In an embodiment, the controller may operate the engine to drive the electric generation device to power the compression device drive motor and simultaneously employ the battery system to power the refrigerant heat rejection heat exchanger fan motor and the refrigerant heat absorption heat exchanger fan motor.

BRIEF DESCRIPTION OF THE DRAWINGS

For a further understanding of the disclosure, reference will be made to the following detailed description which is to be read in connection with the accompanying drawing, where.

DETAILED DESCRIPTION OF THE INVENTION

Figure 1:
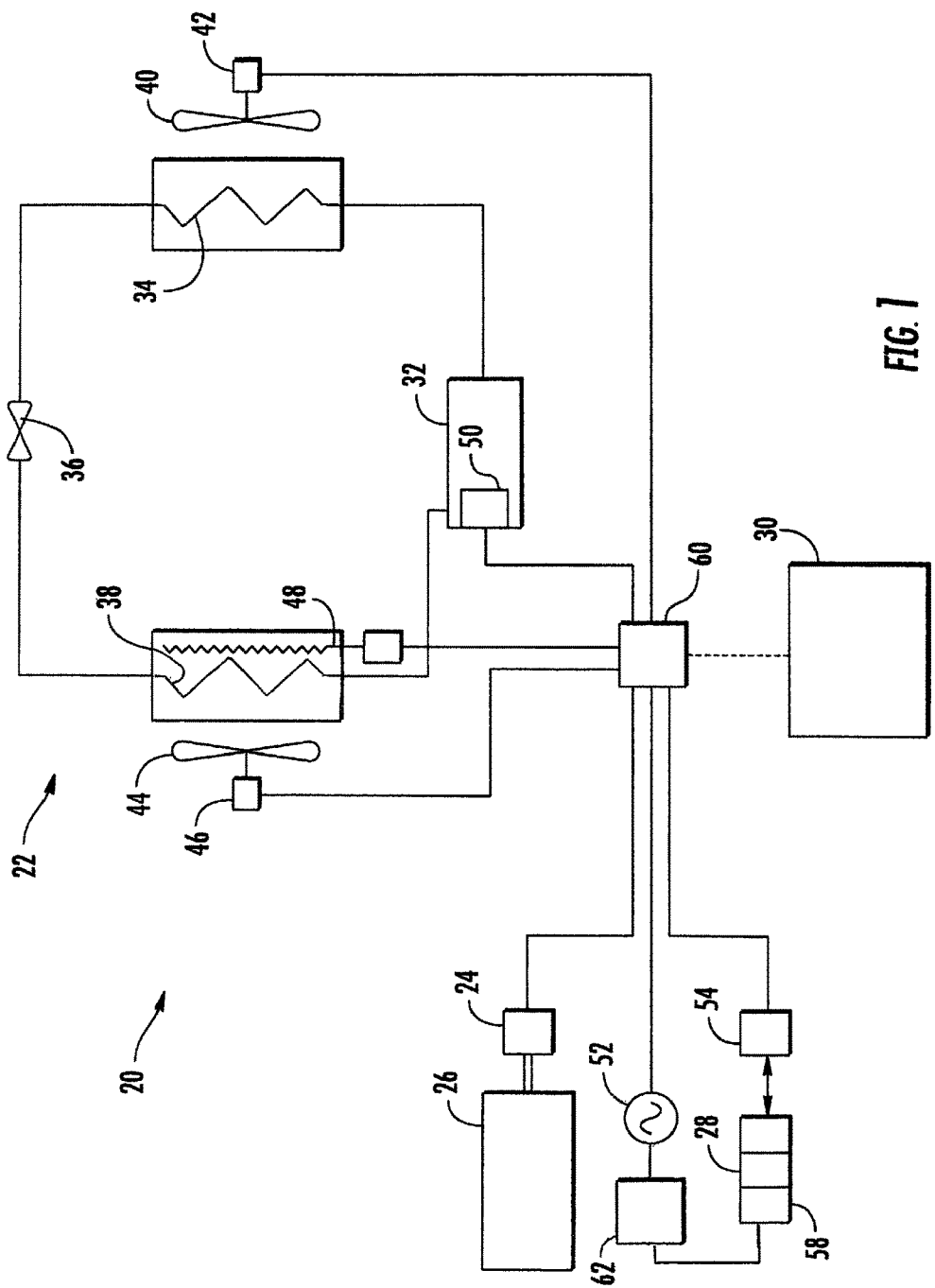
FIG. 1 is a schematic illustration of an exemplary transport refrigeration system in accordance with the disclosure.

The exemplary transport refrigeration system 20 depicted in FIG. 1 includes a refrigeration unit 22, an electric generating device 24, a prime mover 26 for driving the electric generating device 24, a battery system 28, and a controller 30. The refrigeration unit 22 functions, under the control of the controller 30, to establish and regulate a desired product storage temperature within a refrigerated cargo space wherein a perishable product is stored during transport and to maintain the product storage temperature within a specified temperature range. The refrigerated cargo space may be the cargo box of a trailer, a truck, a seaboard shipping container or an intermodal container wherein perishable cargo, such as, for example, produce, meat, poultry, fish, dairy products, cut flowers, and other fresh or frozen perishable products, is stowed for transport.

The transport refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air drawn from the temperature controlled cargo box across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the temperature controlled cargo box. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The refrigeration system 20 also includes a controller 30 configured for controlling operation of the refrigeration system 20 including, but not limited to, operation of various components of the refrigerant unit 22 to provide and maintain a desired thermal environment within the cargo box of the truck or trailer, that is within the temperature controlled space in which a perishable product is stowed. The controller 30 may be an electronic controller including a microprocessor and an associated memory bank. The controller 30 controls operation of various components of the refrigerant unit 22, such as the refrigerant compression device 32 and its associated drive motor 50, the fan motors 42, 46 and the electric heater 48. The controller 30 may also be also to selectively operate the engine 26, typically through an electronic engine controller (not shown) operatively associated with the engine 26.

The refrigeration unit 22 has a plurality power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the electric resistance heater 48 also constitutes a power demand load. The electric resistance heater may be selectively operated by the controller 30 whenever a control temperature within the temperature controlled cargo box drops below a preset lower temperature limit, which may occur in a cold ambient environment. In such an event the controller 30 would activate the electric resistance heater 48 to heat air circulated over the electric resistance heater by the fan(s) 44 associated with the refrigerant heat absorption heat exchanger.

The transport refrigeration system 20 disclosed herein includes two onboard power supplies, namely an electric generating device 24 driven by prime mover 26 and also a high voltage battery system 28. As will be discussed further herein, all of the afore-mentioned plurality of power load demands of the transport refrigeration unit 22 may be powered exclusively by electric power from onboard sources. Optionally, the transport refrigeration system 20 may be provided with a connection 52 adapted to connect to an electric power grid for supplying grid electric power to the transport refrigeration unit 22 during periods when the truck, trailer or container is parked, for example at an overnight truck stop or at a warehouse.

The prime mover 26, which comprises an on-board fossil-fuel engine, most commonly a Diesel engine, drives the electric generating device 24 that generates electrical power. The drive shaft of the engine drives the shaft of the electric generating device. In an electrically powered embodiment of the transport refrigeration unit 10, the electric generating device 24 may comprise a single on-board, engine driven AC generator configured to generate alternating current (AC) power including at least one AC voltage at one or more frequencies. In an embodiment, the electric generating device 24 may, for example, be a permanent magnet AC generator or a synchronous AC generator. In another embodiment, the electric generating device 24 may comprise a single on-board, engine driven DC generator configured to generate direct current (DC) power at at least one voltage. As each of the fan motors 24, 46 and the compression device drive motor 50 may be an AC motor or a DC motor, it is to be understood that various power converters 60, such as AC to DC rectifiers 54, DC to AC inverters 54, AC to AC voltage/frequency converters, and DC to DC voltage converters, may be employed in connection with the electric generating device 24 as appropriate.

Figure 2:
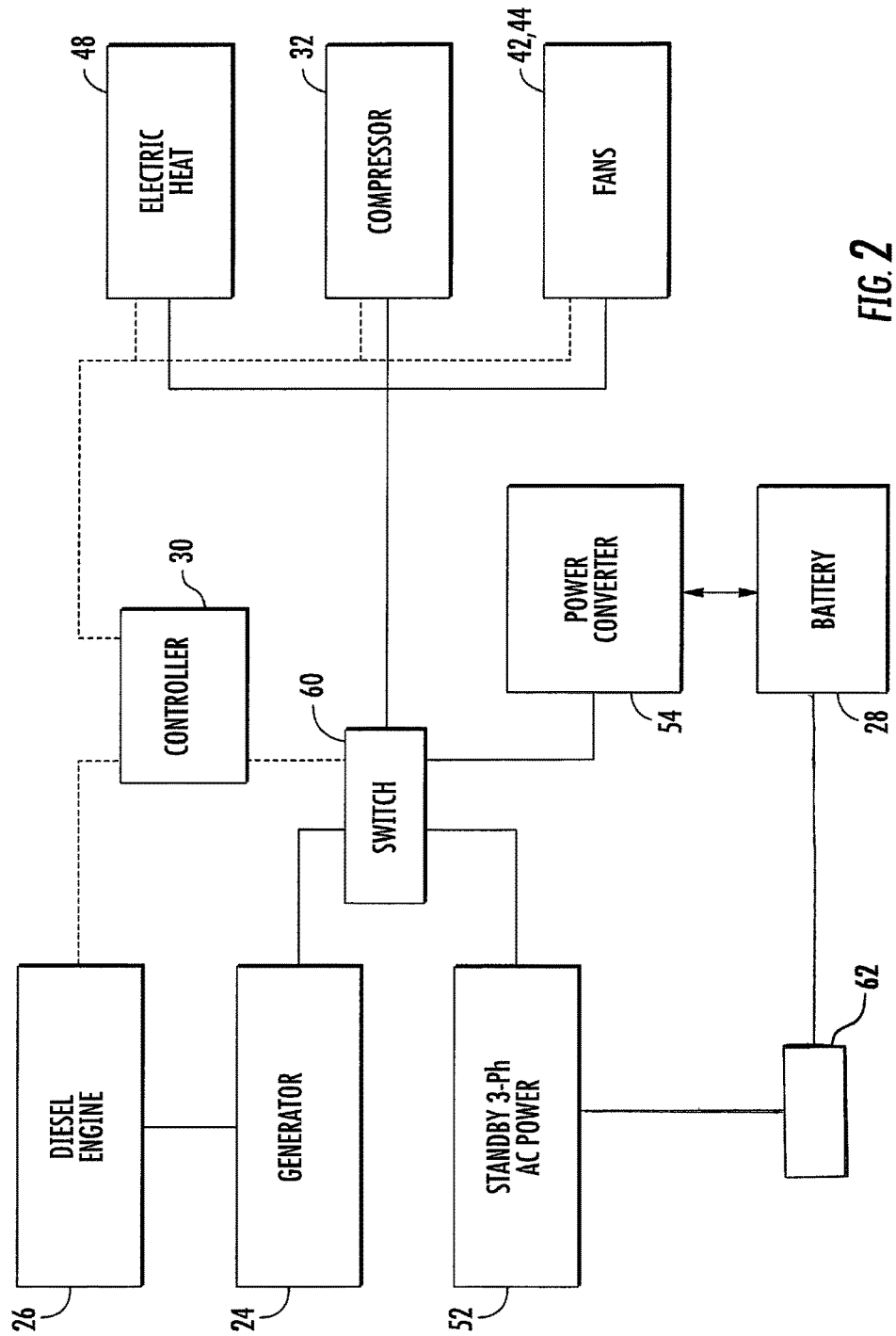
FIG. 2 is a schematic illustration of an embodiment of the power supply control system associated with the refrigeration system of FIG. 1.

In addition to the power sources provided by the standby power grid connection 52 and by the electric generating device 24 driven by the engine 26, a further power source is made available by providing a high voltage battery system 28 made up of a single battery unit 58 or a plurality of battery units 58 appropriately connected together. Referring now to FIG. 2 in particular, the controller 30 is configured to select which power source or power sources to employ to power the refrigeration unit 22 in any particular cooling demand mode of the refrigeration unit 22. The standby power grid connection 52 is only employed when the truck or trailer is parked at a truck stop or warehouse or other facility for an extended period of time. In such case, the power grid connection 52 is mated with a grid power source to supply grid power to the refrigeration unit 22, thereby permitting the controller 30 to shut down the Diesel engine 26 to save fuel and to not tap into the battery system 28 so as to also conserve battery power.

However, when the refrigerant unit 22 is operated in other than the afore-described standby mode, the controller 30 must selectively choose to employ one or both of the engine 26 to drive the electric generating device 24 and the battery system 28 to supply power to meet the plurality of power demand loads of the refrigeration unit 22. In accord with the method disclosed herein for operating the refrigeration unit 22, during a high cooling demand mode, the controller 30 operates the engine 26 to drive the electric generation device 24 for supplying electric power and simultaneously employs the battery system 28 for supplying electric power to jointly power the plurality of power demand loads of the refrigerant unit 22. In a further aspect of the method disclosed herein, during a low cooling demand mode, the controller 30 operates the engine 26 to drive the electric generation device 24 to power the plurality of power demand loads of the refrigeration unit 22 and also charge the battery system 22. The disclosed method may also include the step of, during a low cooling demand mode, employing the battery system 28 to power the plurality of power demand loads of the refrigeration unit 22.

The high cooling demand mode may comprise a temperature pulldown mode wherein the refrigeration unit is operated to reduce a temperature within the temperature controlled space to a set-point temperature. The low cooling demand mode comprises a temperature control mode wherein the refrigeration unit is operated to maintain a temperature within the temperature controlled space within a specified range of a set-point temperature.

After the temperature within the controlled space has been pulled down and has been stabilized at the desired set point temperature selected for the perishable product stowed within the temperature controlled space, the controller 30 may selectively shut the engine 26 down to save fuel and reduce the emission of combustion products into the atmosphere. During the period of shutdown of the engine 26, the controller 30 may selectively employ the battery system alone to power the plurality of power demand loads of the refrigeration unit 22. For example, during the period of engine shutdown, the air within the temperature controlled space is not being circulated. As a consequence, the potential exits for formation of "hot spots", that is localized regions within the cargo box wherein the local temperature has risen above the set point temperature. In an aspect of the method disclosed herein, to prevent the formation of localized hot spots within the temperature controlled space, the controller 30 may selectively power the refrigeration heat absorption heat exchanger fan(s) 46 for selected periods of time and at selected intervals for drawing air from the temperature controlled space, passing the air through the airside passage of the refrigerant heat absorption heat exchanger 44 and supplying the air back to the temperature controlled space thereby causing circulation of air within the temperature controlled space. Although the air is not cooled when traversing the refrigerant heat absorption heat exchanger 44 (the compression device 32 not being in operation), the resultant circulation currents within the temperature controlled space will promote sufficient mixing to reduce, if not eliminate, the formation and severity of "hot spots" within the temperature controlled space.

In an embodiment of the disclosed method, the controller 30 carries out the step of operating the engine 26 to drive the electric generation device 24 and simultaneously employing the battery system 28 to power the plurality of power demand loads of the refrigeration unit 22 during a high cooling demand mode by simultaneously operating both the engine 26 driving the electric generation device 24 and employing the battery system 28 to power the compression device drive motor. The controller 30 may also employ the battery system 28 to power the refrigerant heat rejection heat exchanger fan motor 42 and the refrigerant heat absorption heat exchanger fan motor 46. In an embodiment of the method, the controller 30 carries out the step of operating the engine 26 to drive the electric generation device 24 and simultaneously employing the battery system 28 to together power the plurality of power demand loads of the refrigerant unit 22 during a high cooling demand mode by operating the engine 26 to drive the electric generation device 24 to power the compression device drive motor 50 and employing the battery system 28 to power the refrigerant heat rejection heat exchanger fan motor 42 and the refrigerant heat absorption heat exchanger fan motor 46. During operation of the refrigeration unit 22 at a low cooling demand, the method may include the step of selectively operating the engine 26 to drive the electric generation device 24 to power the plurality of power demand loads of the refrigeration unit 22 and also charge the battery system 28.

In the transport refrigeration system 22 as disclosed herein, the controller 30, in addition to controlling operation of the refrigeration unit 30 in response to cooling demand, is configured, that is operative, to selectively choose which power source or sources to employ in supplying electrical power to meet the plurality of power demand loads of the refrigerant unit 22 and also to select which power source or source will power which components, that is which power demand loads, of the refrigeration unit 22. In a high cooling demand mode during, the controller 30 simultaneously operates the engine 26 to drive the electric generation device 24 for supplying electric power and also employs the battery system 28 to supply electric power to jointly power the plurality of power demand loads of the refrigerant unit 22. In a low cooling demand mode, the controller 30 selectively operates the engine 26 to drive the electric generation device 24 to power the plurality of power demand loads of the refrigeration unit 22 and also charge the battery system 28.

Therefore, unlike in conventional systems wherein the engine 26 must be sized to on its own meet the entire collective plurality of power load demands of the refrigeration unit 22 during operation at maximum cooling demand, in a refrigeration system 20 equipped with a high voltage battery system 28 dedicated to supplying power to the refrigeration unit 22 and operated in accordance with the method disclosed herein, the engine 26 can be used less, thereby saving fuel and reducing emissions to the atmosphere by using less fuel, or the engine 26 can be downsized to a smaller size engine, thereby saving weight and also leading to less fuel consumption. For example, the engine 26 can be downsized to meet the entire collective plurality of power load demands of the refrigeration unit 22 during operation at a cooling capacity significantly below the maximum cooling demand and to simultaneously provide power to charge the battery system 28.

In an embodiment, the controller 30 may be configured, that is operative, to in a low cooling demand mode, and during operation in the low cooling demand mode to shut down the engine 26 and employ only the battery system 28 to power the plurality of power demand loads of the refrigeration unit 22. In this embodiment, the battery system 28 must be sized to provide the required power for meeting the entire plurality of power load demands of the refrigeration unit in the low cooling mode demand, including the fans 42, 46 and the compression device drive motor 50, for a desired time period.

In an embodiment, the controller 30 may be configured to operate the engine 26 to drive the electric generation device 24 to power the compression device drive motor 50 and simultaneously employ the battery system 28 to power the refrigerant heat rejection heat exchanger fan motor 42 and the refrigerant heat absorption heat exchanger fan motor 46, and optionally, if an electric heater is installed, to power the electric heater 48. In this embodiment, the battery system 28 would need to be sized to provide the required power for the power load demands imposed by the fan motors 42, 46 during operation of the refrigeration unit 22 at maximum cooling demand.

As discussed previously, the standby power grid connection 52 may be employed as a power source when the truck or trailer is parked at a truck stop or warehouse or other facility for an extended period of time. In such case, the power grid connection 52 is mated with a grid power source to supply grid power to the refrigeration unit 22, thereby permitting the controller 30 to shut down the Diesel engine 26 to save fuel and to not tap into the battery system 28 so as to also converse battery power. Additionally, a battery charger 62 may be added to the refrigeration system in operational association with the battery pack 28 and the standby power grid connection 52. With the battery charger 62 installed, when the refrigeration system is connected to the grid power source through the standby power grid connection 52, the controller 30 may selectively switch on the battery charger 62 and supply electrical power from the power grid to charge the battery pack 28. The controller 30 may do so whether or not power from the supply power grid is simultaneously also being supplied through the standby power grid connection 52 to more one or more of the plurality of power demand loads of the refrigeration unit 22.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A method for operating a refrigeration system having a refrigeration unit for providing temperature conditioned air to a temperature controlled space, an engine and an electric generation device, the method comprising: providing a battery system having a least one battery unit supplying electric power; and during a first cooling demand mode, operating the engine to drive the electric generation device for supplying electric power and simultaneously employing the battery system for supplying electric power, such that both the electric generation device and the battery system jointly power (i) a compression device drive motor and (ii) at least one of a refrigerant heat rejection heat exchanger fan drive motor, a refrigerant heat absorption heat exchanger fan drive motor and an electric heater; during a second cooling demand mode, operating the engine to drive the electric generation device to power the compression device drive motor and operating the battery system to power at least one of the refrigerant heat rejection heat exchanger fan drive motor, the refrigerant heat absorption heat exchanger fan drive motor and the electric heater; during a third cooling demand mode, operating the engine to drive the electric generation device to power (i) the compression device drive motor and (ii) at least one of the refrigerant heat rejection heat exchanger fan drive motor, the refrigerant heat absorption heat exchanger fan drive motor and also charge the battery system; and during a fourth cooling demand mode, shutting off the engine and operating the battery system to power at least one of the refrigerant heat rejection heat exchanger fan drive motor, the refrigerant heat absorption heat exchanger fan drive motor and the electric heater; wherein employing the battery system during the fourth cooling demand mode comprises selectively powering the refrigerant heat absorption heat exchanger fan drive motor for selected periods of time and at selected intervals.

2. The method as set forth in claim 1 further comprising:
providing a battery charger in operational association with the battery system; and
during a period of shutdown of the engine, selectively employing an external power source for powering the battery charger to charge the battery system.

3. The method as set forth in claim 2 further comprising:
providing a standby power grid connection for connecting to a supply power grid; and
during a period of shutdown of the engine, selectively powering the battery charger to charge the battery system with power supplied from the supply power grid through the standby power grid connection.

4. The method as set forth in claim 1 further comprising employing the battery system to power the refrigerant heat rejection heat exchanger fan motor and the refrigerant heat absorption heat exchanger fan motor.

5. The method as set forth in claim 1 wherein the first cooling demand mode comprises a temperature pulldown mode wherein the refrigeration unit is operated to reduce a temperature within the temperature controlled space to a set-point temperature.

6. The method as set forth in claim 1 wherein a second cooling demand mode comprises a temperature control mode wherein the refrigeration unit is operated to maintain a temperature within the temperature controlled space within a specified range of a set-point temperature, the second cooling demand lower than the first cooling demand.

7. The method as recited in claim 1 wherein the temperature controlled space comprises the perishable cargo hold of a truck, trailer, intermodal container or other transport container.

8. A transport refrigeration system having a refrigeration unit for providing temperature conditioned air to a cargo storage space of a truck, trailer, intermodal container or other transport container, the refrigeration unit having a refrigerant compression device, a refrigerant heat rejection heat exchanger and an associated fan, a refrigerant heat absorption heat exchanger and an associated fan, and a plurality of power demand loads including a compression device drive motor, a refrigerant heat rejection heat exchanger fan drive motor, a refrigerant heat absorption heat exchanger fan drive motor and an electric heater, the transport refrigeration system having an electric generating device and an engine for driving the electric generating device, the transport refrigeration system further comprising: a controller operatively associated with the refrigeration unit, the controller operative to selectively operate the refrigeration unit in multiple modes, the modes comprising: a first cooling demand mode, operating the engine to drive the electric generation device for supplying electric power and simultaneously employing the battery system for supplying electric power, such that both the electric generation device and the battery system jointly power (i) the compression device drive motor and (ii) at least one of the refrigerant heat rejection heat exchanger fan drive motor, the refrigerant heat absorption heat exchanger fan drive motor and the electric heater; a second cooling demand mode, operating the engine to drive the electric generation device to power the compression device drive motor and operating the battery system to power at least one of the refrigerant heat rejection heat exchanger fan drive motor, the refrigerant heat absorption heat exchanger fan drive motor and the electric heater; a third cooling demand mode, operating the engine to drive the electric generation device to power the (i) the compression device drive motor and (ii) at least one of the refrigerant heat rejection heat exchanger fan drive motor, the refrigerant heat absorption heat exchanger fan drive motor and also charge the battery system; and a fourth cooling demand mode, shutting off the engine and operating the battery system to power at least one of the refrigerant heat rejection heat exchanger fan drive motor, the refrigerant heat absorption heat exchanger fan drive motor and the electric heater; wherein during the fourth cooling demand mode the controller employs the battery system to selectively power the refrigerant heat absorption heat exchanger fan drive motor for selected periods of time and at selected intervals.

9. The transport refrigeration system as set forth in claim 8 wherein the controller is further operative to operate the engine to drive the electric generation device to power the compression device drive motor and simultaneously employ the battery system to power the refrigerant heat rejection heat exchanger fan motor and the refrigerant heat absorption heat exchanger fan motor.

\* \* \* \* \*